United States Patent [19]

Stone et al.

[11] Patent Number: 5,079,079
[45] Date of Patent: Jan. 7, 1992

[54] REINFORCED PLASTIC COMPRISING AN ARYLENE SULFIDE SULFONE COPOLYMER MATRIX

[75] Inventors: Mark L. Stone, Idaho Falls, Id.; Rex L. Bobsein; Howard F. Efner, both of Bartlesville, Okla.

[73] Assignee: Phillips Petroleum Company, Bartlesville, Okla.

[21] Appl. No.: 585,844

[22] Filed: Sep. 20, 1990

[51] Int. Cl.$^5$ .................. B32B 7/00; B32B 9/00; D03D 3/00; C08G 75/14
[52] U.S. Cl. .................. 428/260; 428/245; 428/288; 428/290; 428/294; 428/297; 428/408; 428/902; 528/388; 528/391
[58] Field of Search .............. 428/113, 251, 245, 288, 428/260, 408, 902, 290, 294; 528/388, 391

[56] References Cited

U.S. PATENT DOCUMENTS

| | | | |
|---|---|---|---|
| Re. 29,489 | 12/1977 | Newton et al. | 260/607 AR |
| 3,706,702 | 12/1972 | Studinka et al. | 260/47 R |
| 4,024,119 | 5/1977 | Sonnenberg | 260/79.3 A |
| 4,301,274 | 11/1981 | Campbell | 528/388 |
| 4,680,224 | 7/1987 | O'Connor | 428/294 |
| 4,774,276 | 9/1988 | Bobsein et al. | 524/399 |
| 4,792,481 | 12/1988 | O'Connor et al. | 428/288 |
| 4,808,698 | 2/1989 | Bobsein et al. | 528/388 |
| 4,814,224 | 3/1989 | Geibel et al. | 428/252 |
| 4,880,679 | 11/1989 | Bonazza | 428/251 |
| 4,921,558 | 5/1990 | Johnson et al. | 428/113 |
| 4,958,004 | 9/1990 | Hoover et al. | 528/388 |

FOREIGN PATENT DOCUMENTS

| | | |
|---|---|---|
| 1153035 | 5/1969 | United Kingdom . |
| 1153528 | 5/1969 | United Kingdom . |

*Primary Examiner*—George F. Lesmes
*Assistant Examiner*—James D. Withers
*Attorney, Agent, or Firm*—Phillips Petroleum Co.

[57] ABSTRACT

A reinforced plastic which comprises a continuous long fiber reinforcing material in an arylene sulfide sulfone copolymer matrix consisting essentially of two structurally different arylene sulfide sulfone units within the polymer backbone.

20 Claims, 2 Drawing Sheets

REINFORCED PLASTIC COMPRISING AN ARYLENE SULFIDE SULFONE COPOLYMER MATRIX

BACKGROUND OF THE INVENTION

This invention relates to arylene sulfide sulfone copolymers. In one aspect, this invention relates to a process for the production of arylene sulfide sulfone copolymers. In another aspect, this invention relates to reinforced plastics comprising continuous long fiber reinforcement in an arylene sulfide sulfone copolymer matrix.

A wide variety of engineering thermoplastics have been prepared, many of which are currently produced and marketed on a moderate to large scale. While such engineering thermoplastics are useful in many areas, one property of such polymers which needs to be improved is the ability to withstand high use temperatures. Engineering thermoplastics frequently form a continuous matrix for reinforcing agents and fillers which are added to alter the properties of the polymers before they are shaped into useful articles such as electrical and automotive parts. Engineering thermoplastics that will withstand high use temperatures alone or in combination with other ingredients are desirable.

Arylene sulfide sulfone polymers are engineering thermoplastics of potential commercial interest for film, fiber, molding, and composite applications because of their high glass transition temperatures and chemical resistance. It is desirable to increase the glass transition temperature to increase the use temperature for arylene sulfide sulfone polymers. Increasing the glass transition temperature by producing arylene sulfide sulfone copolymers expands the potential applications for arylene sulfide sulfone polymers and would be of potential commercial interest.

SUMMARY OF THE INVENTION

It is an object of the invention to provide a process for producing arylene sulfide sulfone copolymers exhibiting good high temperature properties. It is a further object of the invention to provide a process for producing arylene sulfide sulfone copolymers for use as the matrix in reinforced plastics.

According to the invention, a reinforced plastic is provided which comprises continuous long fiber reinforcement in an arylene sulfide sulfone copolymer matrix wherein the arylene sulfide sulfone copolymer is characterized as consisting essentially of units within the polymer backbone represented by the formulas

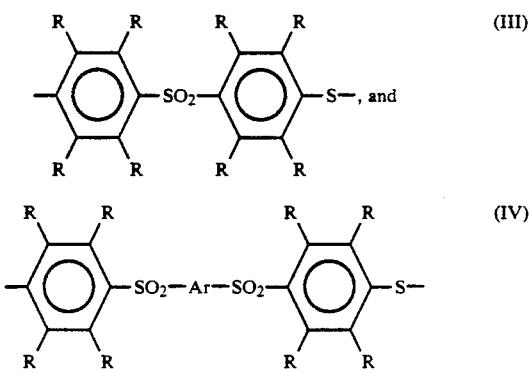

wherein R and Ar are as defined herein, and wherein the number of units of formula (IV) is about 5 to about 95 percent of the sum of the number of units of formula (III) and the number of units of formula (IV).

Further according to the invention, a reinforced plastic is provided wherein the arylene sulfide sulfone copolymer matrix is produced by a process which comprises contacting a dihaloaromatic sulfone having the formula (I)

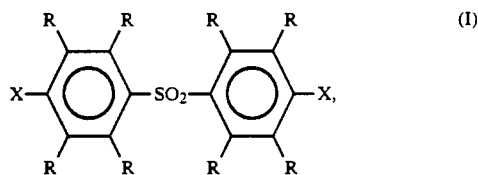

a dihaloaromatic sulfone having the formula (II)

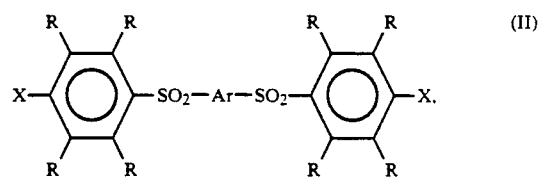

at least one organic amide, at least one sulfur-containing compound, and water wherein X, R, and Ar are defined herein, and wherein the dihaloaromatic sulfone of formula (II) is about 5 to about 95 mole percent of the sum of the number of moles of the dihaloaromatic sulfone of formula (I) and the dihaloaromatic sulfone of formula (II).

DETAILED DESCRIPTION OF THE INVENTION

Figure 1:
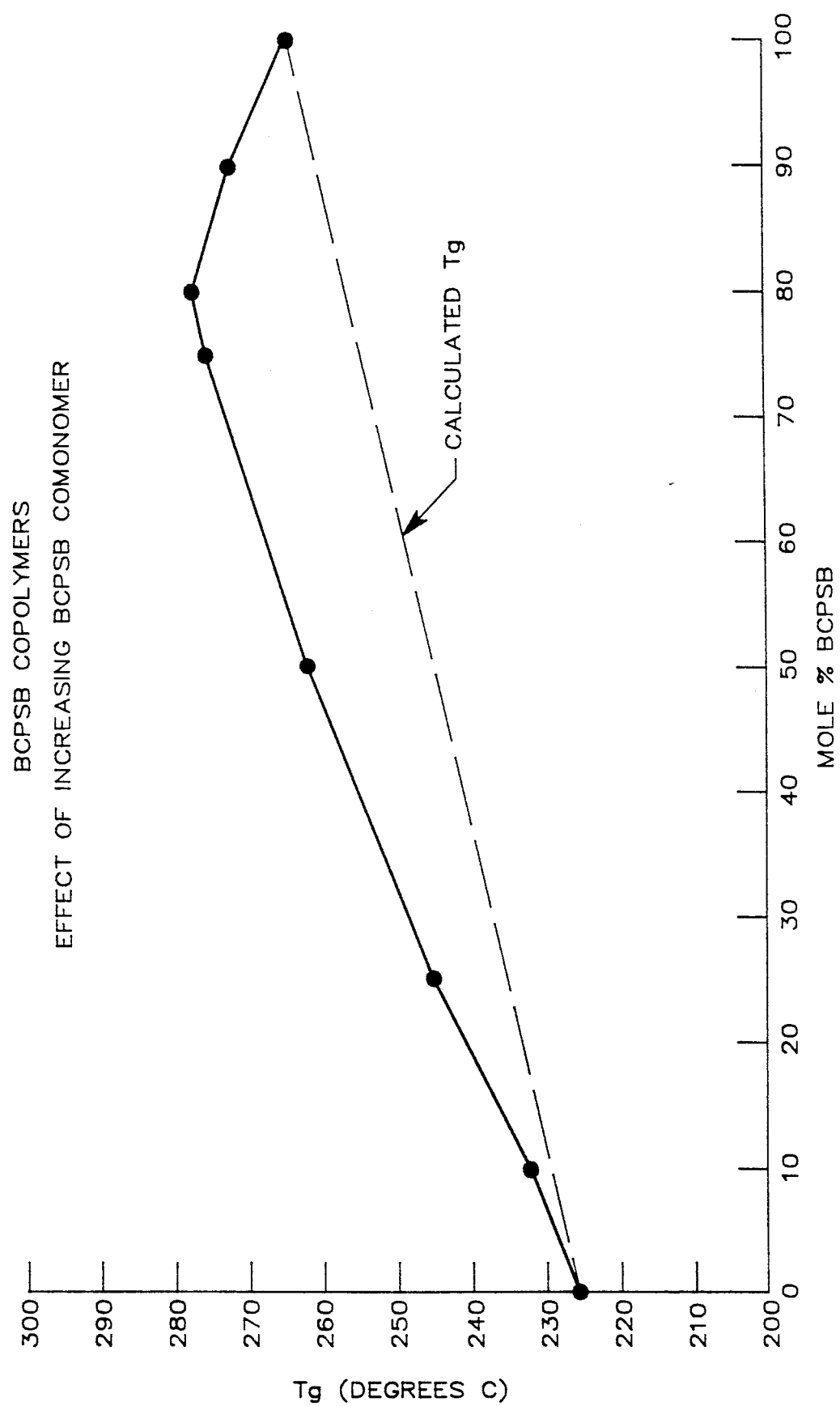
FIG. 1 is a plot demonstrating the effect of the mole percent of dihaloaromatic sulfone of formula (II) based on the total moles of dihaloaromatic sulfone of formulas (I) and (II) on the glass transition temperature of the arylene sulfide sulfone copolymer for polymerizations described in Example II.

This invention relates to a reinforced plastic which comprises continuous long fiber reinforcement in an arylene sulfide sulfone copolymer matrix wherein the arylene sulfide sulfone copolymer is characterized as consisting essentially of units within the polymer backbone represented by the formulas

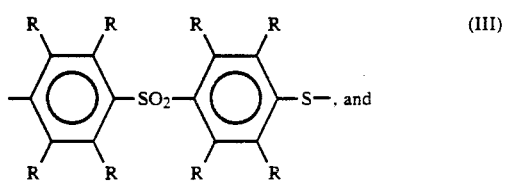

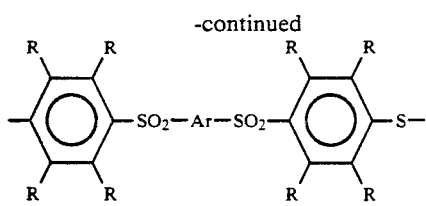

wherein R and Ar are as defined herein, and wherein the number of units of formula (IV) is about 5 to about 95 percent of the sum of the number of units of formula (III) and the number of units of formula (IV).

This invention further relates to a reinforce plastic wherein the arylene sulfide sulfone copolymer matrix is produced by a process comprising contacting: (a) a dihaloaromatic sulfone having the formula (I)

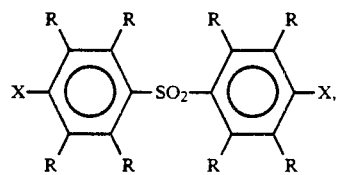

(b) a dihaloaromtic sulfone having the formula (II)

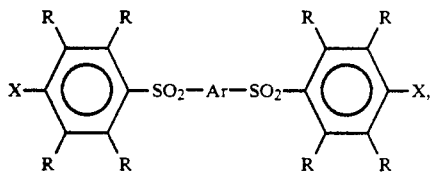

(c) at least one organic amide, (d) at least one sulfur-containing compound, and (e) water, wherein X, R, and Ar are as defined herein, and wherein the dihaloaromatic sulfone of formula (II) is about 5 to about 95 mole percent of the sum of the number of moles of the dihaloaromatic sulfone of formula (I) and the dihaloaromatic sulfone of formula (II). The high molecular weight arylene sulfide sulfone copolymers having improved glass transition temperatures made according to this invention are readily recoverable and well suited for use in high temperature applications such as film, fiber, molding and composites.

Inherent viscosity is a measurement of molecular weight which is particularly useful in characterizing arylene sulfide sulfone copolymers. As used herein, the term "inherent viscosity" (I.V.) refers to dilute solution viscosity which is the ratio of the natural logarithm of the relative viscosity to the polymer solution concentration in grams per deciliter. The relative viscosity is the ratio of the flow time of a specific solution of the polymer to the flow time of the pure solvent. Inherent viscosities for arylene sulfide sulfone copolymers are measured generally according to the method described in ASTM D 1243-79 wherein samples of dried polymer are dissolved in N-methyl-2-pyrrolidone at 30° C. at a polymer concentration of 0.5 grams per deciliter (g/dL) utilizing a No. 100 Cannon-Fenske viscometer.

Dihaloaromatic sulfones employed in the process of the invention can be represented by the following formulas:

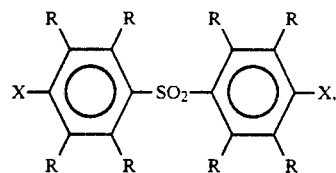

and

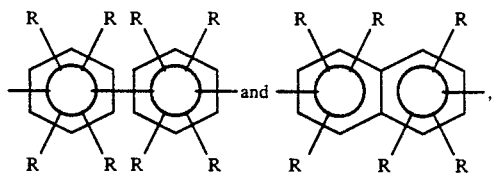

wherein Ar is a divalent radical selected from the group consisting of

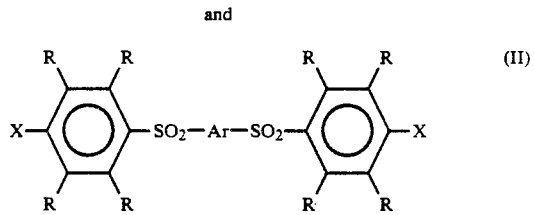

each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups in the molecule being 0 to about 12.

Examples of some dihaloaromatic sulfones of formula (I) that can be employed in the process of the invention include bis(4-fluorophenyl)sulfone, bis(4-chlorophenyl)sulfone, bis(4-bromophenyl)sulfone, bis(4-iodophenyl)sulfone, p-chlorophenyl p-bromophenyl sulfone, p-iodophenyl 3-methyl-4-fluorophenyl sulfone, bis(2-methyl-4-chlorophenyl)sulfone, bis(2,5-diethyl-4-bromophenyl)sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, 2-isobutyl-4-chlorophenyl 3-butyl-4-bromophenyl sulfone, and the like, and mixtures thereof. The presently preferred dihaloaromatic sulfone of formula (I) is bis(4-chlorophenyl)sulfone because of its effectiveness and commercial availability.

Examples of some dihaloaromatic sulfones of formula (II) that can be employed in the process of the invention include 4,4'-bis(p-chlorophenylsulfonyl)biphenyl, 4,4'-bis(p-fluorophenylsulfonyl)biphenyl, 4,4'-bis(p-bromophenylsulfonyl)biphenyl, 4,4'-bis(p-iodophenylsulfonyl)biphenyl, 2,6-bis(p-chlorophenylsulfonyl)napthalene, 2,6-bis(p-bromophenylsulfonyl)naphthalene, 7-ethyl-1,5-bis(p-chlorophenylsulfonyl)naphthalene, 7-ethyl-1,5-bis(p-iodophenylsulfonyl)naphthalene, and the like, and mixtures thereof. The presently preferred dihaloaromatic sulfone of formula (II) is 4,4'-bis(p-chlorophenylsulfonyl)biphenyl because of excellent results obtained therewith.

The amount of dihaloaromatic sulfone employed in the invention depends upon the amount of sulfur-containing compound employed. The amount of dihaloaromatic sulfone can be expressed in terms of a molar ratio of the sum of the dihaloaromatic sulfone of formula (I)

and the dihaloaromatic sulfone of formula (II) to sulfur-containing compound and will generally be about 0.7:1 to about 1.3:1. Preferably, this molar ratio is about 0.9:1 to about 1.15:1.

The amount of dihaloaromatic sulfone of formula (II) can be expressed in terms of a mole percent based on the sum of the number of moles of dihaloaromatic sulfone of formula (I) and dihaloaromatic sulfone of formula (II). Generally, the dihaloaromatic sulfone of formula (II) is about 5 to about 95 mole percent, preferably about 60 to about 95 mole percent, and most preferably about 70 to about 90 mole percent of the sum of the number of moles of dihaloaromatic sulfone of formula (I) and the dihaloaromatic sulfone of formula (II).

The organic amides used in the process of the invention should be substantially liquid at the reaction temperature and pressure employed. The amides can be cyclic or acyclic and can have 1 to about 10 carbon atoms per molecule. Examples of some suitable organic amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N-ethyl-2-pyrrolidone, N-cyclohexyl-2-pyrrolidone, N-dodecyl-3-octyl-2-pyrrolidone, N-N'-ethylenedi-2-pyrrolidone, hexamethylphosphoramide, tetramethylurea, and the like, and mixtures thereof.

The amount of organic amide employed according to the invention can be expressed in terms of molar ratio based on the sulfur-containing compound employed. Broadly, the molar ratio of organic amide to sulfur-containing compound as defined herein will be about 2:1 to about 24:1, preferably about 4:1 to about 16:1. N-methyl-2-pyrrolidone is especially preferred because of excellent results obtained therewith and ready availability.

In accordance with the invention, suitable sulfur-containing compounds which can be employed in the production of the arylene sulfide sulfone copolymers are selected from the group consisting of alkali metal sulfides, alkali metal bisulfides, and hydrogen sulfide. Suitable alkali metal sulfides include lithium sulfide, sodium sulfide, potassium sulfide, rubidium sulfide, cesium sulfide and mixtures thereof. The alkali metal sulfide can be used in anhydrous form, as a hydrate, or as an aqueous mixture. Sodium sulfide is preferred because of ready availability and good results obtained therewith. Suitable alkali metal bisulfides include lithium bisulfide, sodium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. for example, an aqueous solution of sodium bisulfide having about 60 weight percent sodium bisulfide is convenient to use.

The amount of water employed according to the invention can be expressed in terms of molar ratio based on the organic amide employed. Broadly, the molar ratio of organic amide to water will be from about 0.4:1 to about 1.6:1, preferably about 0.45:1 to about 1.3:1, and most preferably from about 0.5:1 to about 1.2:1.

In a preferred embodiment, an alkali metal carboxylate is employed in the process of the invention. Alkali metal carboxylates that can be employed in the process of the invention can be represented by the formula R'CO$_2$M where R' is a hydrocarbyl radical selected from alkyl, cycloalkyl, and aryl and combinations thereof such as alkaryl, aralkyl, and the like, the number of carbon atoms in said R' being within the range of 1 to about 20, and M is an alkali metal selected from the group consisting of lithium, sodium, potassium, rubidium and cesium.

Examples of some alkali metal carboxylates that can be employed in the process of the invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyl-octanoate, potassium dodecanoate, rubidium 4-ethyltetradecanoate, sodium octadecanoate, sodium heneicosanoate, lithium cyclohexane carboxylate, cesium cylcododecane carboxylate, sodium 3-methylcyclopentane carboxylate, potassium cyclohexylacetate, potassium benzoate, lithium benzoate, sodium benzoate, potassium m-toluate, lithium phenyl acetate, sodium 4-phenylcyclohexane carboxylate, potassium p-tolylacetate, lithium 4-ethylcyclohexylacetate and the like and mixtures thereof. The presently preferred alkali metal carboxylate is sodium acetate because of its effectiveness and commercial availability.

The amount of alkali metal carboxylate employed according to the invention can be expressed in molar terms of molar ratio based on the sulfur-containing compound employed. Broadly, the molar ratio of alkali metal carboxylate to sulfur-containing compound will be from about 0.002:1 to about 2:1, preferably about 0.05:1 to about 1.1:1, and most preferably about 0.98:1 to about 1.02:1.

In a further preferred embodiment, a base selected from the group consisting of alkali metal hydroxide, alkali metal carbonate, and mixtures of at least one alkali metal hydroxide with at least one alkali metal carbonate is employed when the sulfur-containing compound is an alkali metal bisulfide or hydrogen sulfide.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can conveniently be utilized in the process of the invention as an aqueous solution. For example, an aqueous solution of sodium hydroxide having about 50 weight percent sodium hydroxide is convenient to use.

Alkali metal carbonates that can be employed according to the invention include lithium carbonate, sodium carbonate, potassium carbonate, rubidium carbonate, cesium carbonate, and mixtures thereof. Sodium carbonate is preferred because of ready availability and generally good results obtained therewith.

If a mixture of at least one alkali metal hydroxide and at least one alkali metal carbonate is employed, said mixtures should contain at least about 5 mole percent alkali metal carbonate. Preferably, said mixture will have about 20 to about 90 mole percent alkali metal carbonate and more preferably about 40 to about 80 mole percent alkali metal carbonate.

When an alkali metal hydroxide is employed, it is convenient to express the amount of alkali metal hydroxide employed in terms of a molar ratio of alkali metal hydroxide to sulfur-containing compound. Broadly, the molar ratio of alkali metal hydroxide to sulfur-containing compound will be from about 0.05:1 to about 4:1, preferably about 0.5:1 to about 2.05:1.

Alternately, the amount of alkali metal hydroxide employed can be expressed in terms of a ratio of equivalents of alkali metal hydroxide to moles of sulfur-containing compound. Broadly, the ratio of equivalents of alkali metal hydroxide to moles of sulfur-containing compound will be from about 0.05:1 to about 4:1, preferably about 0.5:1 to about 2.05:1.

When an alkali metal carbonate is employed, it is convenient to express the amount of alkali metal carbonate employed in terms of a molar ratio of alkali metal carbonate to sulfur-containing compound. Broadly, the molar ratio of alkali metal carbonate to sulfur-containing compound will be from about 0.025:1 to about 3:1, preferably about 0.25:1 to about 2:1. Alternately, the amount of alkali metal carbonate employed can be expressed in terms of a ratio of equivalents of alkali metal carbonate to moles of sulfur-containing compound. Broadly, the ratio of equivalents of alkali metal carbonate to moles of sulfur-containing compound will be from about 0.05:1 to about 6:1, preferably about 0.5:1 to about 4:1.

When a mixture of at least one alkali metal hydroxide and at least one alkali metal carbonate is employed, it is convenient to express the amount of total base in terms of a ratio of equivalents of base to moles of sulfur-containing compound since one mole of alkali metal hydroxide corresponds to one equivalent of alkali metal hydroxide while one mole of alkali metal carbonate corresponds to two equivalents of alkali metal carbonate. Broadly, the ratio of equivalents of total base to moles of sulfur-containing compound will be from about 0.05:1 to about 6:1, preferably about 0.5:1 to about 4:1.

The charge sequence of the various compounds employed in the process of the invention can be varied as desired. One convenient method is to simply charge all the compounds in any desired sequence to a suitable reaction vessel equipped with agitation means at about room temperature and then to heat the mixture with stirring to the desired reaction temperature and to hold the mixture for the desired length of time at said temperature. It is also possible to preheat a mixture of only certain of the compounds in a separate vessel then to charge this mixture to a preheated mixture of the remainder of the compounds in the reaction vessel. For example, an organic amide can be pre-reacted with an alkali metal hydroxide in the presence of water, and this mixture subsequently contacted with the sulfur-containing compound to form a complex comprising these components. The complex is then utilized to contact the dihaloaromatic sulfones of formulas (I) and (II) under suitable polymerization conditions to produce the arylene sulfide sulfone copolymer. Although the reaction temperature at which the polymerization is conducted can vary over a considerable range, generally it will be within the range of about 140° C. to about 240° C., preferably about 185° C. to about 225° C. The reaction time can vary widely, depending in part on the reaction temperature employed, but generally will be within the range of about 10 minutes to about 72 hours, preferably about 1 hour to about 4 hours. The pressure should be sufficient to maintain the dihaloaromatic sulfones and other organic compounds present substantially in the liquid phase.

The arylene sulfide sulfone copolymers produced by the process of the invention are in particle form and can be separated from the reaction mixture by conventional procedures, e.g. by filtration of the reaction mixture to recover the polymer followed by washing at least once with water. A presently preferred recovery method involves diluting the hot reaction mixture with a mixture of water and organic amide and cooling the diluted mixture while stirring. The separated polymer particles can then be washed with water preferably with at least a portion of the washing being conducted at an elevated temperature within the range of about 130° C. to about 250° C. and then dried to provide a polymer which is low in ash-forming substances and is relatively light in color as well as exhibiting good melt flow stability under conditions of melt processing operations such as injection molding. In addition, it is presently preferred to employ a zinc carboxylate salt in the treatment of the recovered arylene sulfide sulfone copolymer in at least one of the above-described washing steps to improve the melt flow stability of the copolymer. Such a process for treating with a zinc carboxylate salt is described in U.S. Pat. No. 4,774,276 which is hereby incorporated by reference herein. If the arylene sulfide sulfone copolymer is treated with a zinc carboxylate salt as described above, it is further preferred that the arylene sulfide sulfone copolymer be subsequently treated with an organic acid, particularly acetic acid, during at least one of the above-described washing steps.

The structure of the arylene sulfide sulfone copolymers produced according to the invention can be characterized as consisting essentially of units within the polymer backbone represented by the following structural formulas:

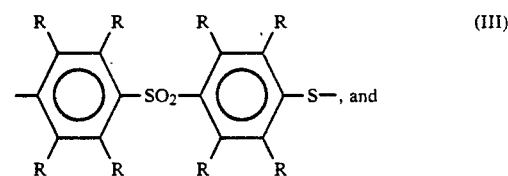

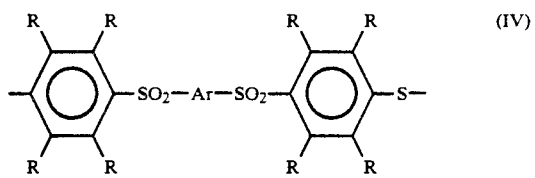

wherein R and Ar are as defined herein. The arylene sulfide sulfone copolymers can also have minor amounts of other structural groups present, particularly at the polymer end groups.

The amount of structural units of formula (IV) in the copolymer can be expressed in terms of a percent based on the sum of the number of units of formula (III) and the number of units of formula (IV). Generally, the amount of units of formula (IV) is about 5 to about 95 percent, preferably about 60 to about 95 percent, and most preferably about 70 to about 90 percent of the sum of the number of units of formula (III) and the number of units of formula (IV).

The arylene sulfide sulfone copolymers produced according to the invention are characterized as having a glass transition temperature, $T_g$, in the range of from 225° to 280° C., preferably from 265° to 280° C., and most preferably from 270° to 280° C. The glass transition temperature can be measured using a Perkin-Elmer Differential Scanning Calorimeter, Model DSC-2 at a sample heating rate of 20° C./minute. The arylene sulfide sulfone copolymers produced according to the invention are also characterized as having an inherent viscosity of at least 0.3 deciliters per gram (dL/g).

The arylene sulfide sulfone copolymers produced by the process of the invention can be blended with fillers, fibers, pigments, extenders, other polymers and the like. The arylene sulfide sulfone copolymers can be cured to provide cured products having high thermal stability and good chemical resistance, wherein curing is defined as a distinct process step after polymer drying comprising a thermal treatment on the polymer in the presence of an oxygen-containing atmosphere. The preferred oxygen-containing atmosphere is air. The arylene sulfide sulfone copolymers of the invention are useful in the production of film, fibers, molded objects, and composites.

The arylene sulfide sulfone copolymers of the invention can be employed as the continuous matrix in continuous long fiber reinforced compositions such as prepregs, laminates and pultruded shapes.

Such fiber reinforced compositions can be prepared by any method known to those of ordinary skill in the art. Examples of such methods are those described in U.S. Pat. Nos. 4,680,224; 4,792,481; and 4,814,224, which are hereby incorporated by reference herein.

The fiber reinforcement can be selected from randomly-oriented loose fibers, fiber mat, and unidirectionally oriented fibers. When a fiber mat is employed as the fibrous reinforcing material, it is preferably provided in the form of woven fiber mat, chopped fiber mat, continuous strand mat or non-woven fiber mat, the most preferred being chopped fiber mat or continuous strand mat.

The fiber reinforcement can be composed of fibers of glass, carbon, aramid (aromatic polyamide), metal, fiber-forming inorganic material such as beryllia, magnesia, alumina, silica, zirconia, thoria, boron nitride, boron carbide, silicon carbide and alumino-silicate, and mixtures thereof. The preferred fiber reinforcement comprise fibers of glass, carbon, aramid or mixtures thereof. In a further preferred embodiment the fibers are glass or carbon.

Generally, the amount of arylene sulfide sulfone copolymer matrix in the fiber reinforced compositions is in the range of about 20 to about 50 weight percent of the fully consolidated composition. In one embodiment in which the fiber reinforcement is composed of glass fibers, the arylene sulfide sulfone copolymer content is preferably in the range of about 20 to about 40 weight percent. In another embodiment in which the fiber reinforcement is composed of carbon fibers, the arylene sulfide sulfone copolymer content is preferably in the range of about 25 to about 45 weight percent of the total composition.

EXAMPLES

In the following examples, inherent viscosities (I.V.), in deciliters per gram (dL/g), of the sulfide sulfone polymers were determined at 30° C. at a concentration of 0.50 g/100 mL in N-methyl-2-pyrrolidone (NMP). Polymer glass transition temperatures (Tg), in degrees Celsius, were measured using a Perkin-Elmer Differential Scanning Calorimeter, Model DSC-2, with a nitrogen atmosphere at a sample heating rate of 20° C./min.

Melt flow rates were determined using the procedure in ASTM D-1238, Procedure B, Automatically Timed Flow Rate Measurement under condition 343/5.0 for polyphenylene sulfide sulfone and 360/5.0 for polymers made with 4,4'-bis(p-chlorophenylsulfonyl)biphenyl, each modified to employ a five minute preheat. Melt flow values are expressed as g/10 min. Polymer ash values were determined by burning a weighed sample of the polymer in a platinum dish. Residual carbonaceous material was removed by heating at 540° C. in a muffle furnace. The weight of the residue (ash) is expressed as a percentage of the original weight of the polymer.

Elemental analyses were carried out using sample combustion for carbon, hydrogen, nitrogen, and sulfur and neutron activation for chlorine and oxygen.

4,4'-Bis(p-chlorophenylsulfonyl)biphenyl (BCPSB) was prepared by the Friedel-Crafts reaction of 4-chlorophenylsulfonyl chloride with biphenyl.

EXAMPLE I

A copolymer was prepared in a 7.6-liter, stirrer-equipped autoclave by charging 0.375 g-mol bis(4-chlorophenyl)sulfone (BCPS), 1.125 g-mol BCPSB, 1.5 g-mol sodium acetate (NaOAc), 3.0 g-mol sodium carbonate (Na2CO3), 10.227 g/mol water, 1.456 g-mol sodium hydrosulfide (NaSH) as a 59.09 weight percent aqueous solution, and 12 g-mol NMP to the autoclave, which was then flushed five times with nitrogen. The polymerization mixture contained 75 mole percent BCPSB and 25 mole percent BCPS. There was a 3 mole percent excess of total chloride monomer (BCPSB and BCPS) over the amount of sulfur source (NaSH).

The autoclave was heated to 200° C. with stirrer operating at 500 rpm. After a polymerization time of three hours at 200° C., the autoclave pressure was 155 psig. The autoclave was cooled, opened, and the recovered polymer allowed to contact water overnight.

After the polymer had been filtered from the water, the polymer was washed four times with hot water and four times with cold water. The washed polymer was dried in a vacuum oven at 145° C. to yield Polymer 1 in a yield of 91 percent. Polymer 1 had an I.V. of 0.33 dL/g and a melt flow of 2.8 g/10 min. The ash level of Polymer 1 was 0.55 weight percent.

Polymer 1 was charged to an autoclave with 5.5 g zinc acetate and four liters deionized water. After the autoclave had been purged four times with nitrogen, it was heated to 185° C. and held for one hour. The autoclave was then cooled and the recovered polymer washed three times with hot water and three times with cold water. This washed and filtered polymer was charged to an autoclave with 18 g acetic acid and four liters deionized water. After the autoclave had been purged with nitrogen four times, it was heated to 220° C. and held for 0.5 hour. The autoclave was cooled and opened and the polymer was washed three times with hot water and three times with cold water.

The dried (140° C. overnight in a vacuum oven) polymer (designated Polymer 1A) had an I.V. of 0.34 dL/g and a melt flow of 9.1 g/10 min. There is little change in I.V. by the zinc acetate and acetic acid treatments. The Tg of Polymer 1A was 259° C. and the ash level was 0.04 weight percent.

EXAMPLE II

This example compares a series of polymers made with different levels of BCPSB and BCPS monomers. The polymerizations were carried out in a manner similar to the procedure described in Example I. Changes in the chemicals used from Example I are shown in Table I. Some polymerizations were carried out in smaller reactors and the reagent levels were scaled down proportionally. The polymers were washed with water as described in Example I for Polymer 1 and were not treated with zinc acetate and acetic acid.

In polymerization runs 5, 6 and 7, three g-mol NMP were used. The polymerization conditions were three hours at 215° C. in run 2 and three hours at 210° C. in run 3. At the conclusion of the polymerization time, 80 mL NMP and 20 mL water were added to the autoclave in runs 5 and 6, 100 mL NMP was added to run 7, and 900 mL NMP in run 8. Polymer 2 is a homopolymer made with BCPSB. Polymer 9 is polyphenylene sulfide sulfone homopolymer made with BCPS.

TABLE I

| Copolymer Polymerization | | | | | | |
|---|---|---|---|---|---|---|
| Polymer | BCPSB, mole %[a] | NaSH, moles | NaOAc, moles | $Na_2CO_3$, moles | $H_2O/S$ mole ratio | Excess Monomer, mole %[b] |
| 2 | 100 | 1.492 | 1.50 | 3.0 | 9.46 | 0.5 |
| 3 | 90 | 1.471 | 1.50 | 3.0 | 9.60 | 2.0 |
| 4 | 80 | 1.492 | 1.50 | 3.0 | 9.46 | 0.5 |
| 5 | 75 | 0.375 | 0.375 | 0.75 | 9.42 | −1.0 |
| 6 | 50 | 0.375 | 0.375 | 0.75 | 9.42 | −1.0 |
| 7 | 25 | 0.375 | 0.375 | 0.75 | 9.42 | −1.0 |
| 8 | 10 | 1.50 | 1.50 | 3.0 | 8.91 | 0 |
| 9 | 0 | 0.375 | 0.375 | 0.75 | 9.42 | −1.0 |

[a]Mole percent BCPSB in total BCPSB plus BCPS charge.
[b]Excess chlorine-containing monomer, i.e. amount of moles of BCPS plus BCPSB compared with moles of NaSH.

An elemental analysis of copolymer 7 gave C, 58.61; H, 3.32; N, 0.05; S, 23.2; O, 13.78; Cl, 0.21 weight percent and the calculated values for the copolymer produced with 75 mole percent BCPS and 25 mole percent BCPSB is C, 59.58; H, 3.33; N, 0.0; S, 23.86; O, 13.23, Cl, 0.0 weight percent.

The polymerization yields and polymer properties of these polymers are shown in Table II. All polymers have I.V. of 0.39 dL/g or higher. FIG. 1 is a plot of the polymer Tg against the mole percent BCPSB added to the polymerization mixture. The dotted line between the two homopolymer Tg values is the expected Tg for copolymers in the absense of synergistic effects. The Tg values of the copolymers were found to be significantly higher than the calculated values. Especially high Tg values are noted for copolymers made with BCPSB between about 60 and about 95 mole percent.

TABLE II

| Effect of BCPSB Level on Copolymer Tg | | | | |
|---|---|---|---|---|
| Polymer | BCPSB, mole %[a] | I.V., dL/g | Tg, °C. | Yield, % |
| 2 | 100 | 0.47 | 265 | 84 |
| 3 | 90 | 0.39 | 273 | 96 |
| 4 | 80 | 0.47 | 278 | 98 |
| 5 | 75 | 0.47 | 277 | 100 |
| 6 | 50 | 0.49 | 265 | 100 |
| 7 | 25 | 0.50 | 245 | 98 |
| 8 | 10 | 0.53 | 232 | 100 |
| 9 | 0 | 0.49 | 226 | 95 |

[a]See footnote a in Table 1.

A carbon-13 nuclear magnetic resonance spectrum of a 50 mole percent BCPSB-50 mole percent BCPS copolymer similar to Polymer 6 was determined in deuterochloroform at 30° C. This spectrum confirmed the presence of structures in the polymer corresponding to both BCPSB and BCPS monomers.

EXAMPLE III

This example presents a series of copolymers prepared using different levels of reagents and different conditions. The results are summarized in Table III. Polymer 10 was prepared with sodium hydroxide (NaOH) as the base and Polymer 11 was prepared with $Na_2CO_3$ as the base. At the conclusion of the polymerization time in runs 10 and 11, 900 mL NMP and 150 mL water were added to the autoclave. Polymers 4 (repeated from Example II) and 12 were prepared using 80 mole percent BCPSB and 0.5 and 3.0 mole percent, respectively, excess BCPSB plus BCPS over the sulfur-source molar level.

TABLE III

| Effect of Polymerization Variables on Copolymer Polymerization | | | | | | | | |
|---|---|---|---|---|---|---|---|---|
| Polymer | BCPSB, mole %[a] | Base | Excess Monomer mole %[b] | Temp., °C. | Time, hrs | Ash, wt. % | I.V. dL/g | Tg, °C. |
| 10 | 10 | NaOH[c] | 0.0 | 200 | 3 | 0.25 | 0.40 | 220 |
| 11 | 10 | $Na_2CO_3$ | 0.0 | 200 | 3 | — | 0.45 | 233 |
| 4 | 80 | $Na_2CO_3$ | 0.5 | 200 | 3 | 0.09 | 0.47 | 278 |
| 12 | 80 | $Na_2CO_3$ | 3.0 | 200 | 3 | 0.30 | 0.28 | 263 |
| 13 | 90 | $Na_2CO_3$ | 2.0 | 200 | 3 | 0.28 | 0.25 | 259 |
| 14 | 90 | $Na_2CO_3$ | 2.0 | 200 210 | 2 1 | 0.05 | 0.32 | 265 |
| 3 | 90 | $Na_2CO_3$ | 2.0 | 210 | 3 | <0.01 | 0.39 | 273 |
| 15 | 90 | $Na_2CO_3$ | 0.5 | 210 | 3 | 0.04 | 0.46 | 271 |

[a]See footnote a of Table I.
[b]Excess chlorine-containing monomer, i.e. mole percent excess plus BCPSB over sulfur source level.
[c]1.50 g-mol NaOH. All other bases 3.0 g-mol.

Higher reaction temperatures were used in the preparation of Polymers 14, 3 (repeated from Example II), and 15 compared with Polymer 13. The use of higher reaction temperatures results in an increase in both I.V. and Tg for the 90 mole percent BCPSB copolymers. All polymers in this example were washed with water following the polymerization as described in Example I for Polymer 1 and were not treated with zinc acetate or acetic acid.

The results of these examples show that BCPSB/BCPS copolymers with high Tg values can be prepared under a variety of polymerization and recovery conditions.

EXAMPLE IV

An arylene sulfide sulfone copolymer containing 75 mole percent BCPSB and 25 mole percent BCPS was prepared for injection molding bars for evaluations of physical properties. Four polymerization runs were carried out as described in Example I and the recovered polymers were treated with zinc acetate and acetic acid as described in Example I. Polymers 16, 1, 17, and 18 are described in Table IV. Polymer 1 in this example is the same as the polymer in Example I. Polymer 1 has a Tg of 259° C. These four polymers have very low ash values between 0.04 and 0.07 weight percent.

TABLE IV

Copolymer Samples for Injection Molding[a]

| Polymer | I.V., dL/g | Melt Flow g/10 min. | Ash, wt. % |
|---|---|---|---|
| 16 | 0.37 | 5 | 0.04 |
| 1 | 0.34 | 9 | 0.04 |
| 17 | 0.28 | 26 | 0.05 |
| 18 | 0.31 | 16 | 0.07 |

[a]All prepared with 75 mole percent BCPSB and 25 mole percent BCPS.

These four polymer samples were combined and designated Polymer 19. Polymer 19 was dried at 175° C. in a vacuum oven and then dried for two hours at 150° C. in a forced air oven immediately before molding. For comparison, control polyphenylene sulfide sulfone (PPSS) Polymer 20 was prepared by a procedure similar to that described in U.S. Pat. No. 4,774,276, including a zinc acetate treatment, and had a melt flow of 65 g/10 min at 343° C.

Injection molding was carried out using an Arburg ECO injection molder with a barrel temperature set initially at 360° C. and increased to 374° C. during the run. An injection pressure of 248 MPa was used and the mold temperature was 135° C. Control Polymer 20 was injection molded at 338° C. and 76 MPa with a mold temperature of 135° C. An ASTM type mold (D647) was used to obtain Type IV tensile bars and 0.3175 cm thick impact bars.

The physical properties of the molded bars were determined by ASTM D-638 and D-790 and are shown in Table V. Polymer 19 has a Tg of 260° C., while Polymer 20 has a Tg of only 215° C. There is little difference in mechanical properties between Polymers 19 and 20 at room temperature. However, the heat deflection temperature (HDT) of Polymer 19 is almost 50 degrees Celsius higher than that of Polymer 20. Chemical exposure testing at 93° C. shows that the resistance of the two samples to several chemicals is similar. Polymer 20 is more resistant to methanol, toluene, and methyl ethyl ketone than Polymer 19.

TABLE V

Injection Molded Part Properties

| | Copolymer | PPSS |
|---|---|---|
| Polymer | 19 | 20 |
| Melt Flow, g/10 min. | 12[a] | 65[b] |
| Tg, °C. | 260 | 215 |
| Flexural Modulus, MPa | 3000 | 3200 |
| Flexural Strength, MPa | 143 | 145 |
| Tensile Strength, yield, MPa | 91 | 92 |
| Tensile Strength, break, MPa | 64 | 59 |
| Izod Impact, Joules/m | | |
| Notched | 16 | 16 |
| Unnotched | 880 | 1070 |
| HDT, °C. at 1.8 MPa | 223 | 175 |
| 175° C. Flexural Modulus, MPa | 2100 | 2300 |
| 175° C. Flexural Strength, MPa | 44 | 77 |
| 175° C. Tensile Strength, MPa | 34 | 48 |
| Chemical Exposure, %[c] | | |
| 15% NaOH | 103 | 104 |
| Methanol | 50 | 88 |

TABLE V-continued

Injection Molded Part Properties

| | Copolymer | PPSS |
|---|---|---|
| Toluene | 50 | 78 |
| Methyl ethyl ketone | dissolved | 60 |
| JP-4 Jet Fuel | 100 | 103 |
| Unleaded Gasoline | 105 | 103 |

[a]At 360° C.
[b]At 343° C.
[c]Two weeks at 93° C., percent tensile strength retained from original value.

EXAMPLE V

This example describes a composite structure prepared from a copolymer made from 50 mole percent BCPSB and 50 mole percent BCPS. A polymerization run was carried out in a manner similar to that described in Example I. The total amount of chloride monomer (BCPSB plus BCPS) was 1.5 mole percent excess over the NaSH mole level. At the conclusion of the polymerization time, 800 mL of NMP and 200 mL of water were added to the reaction mixture. The yield of the polymerization was 97 percent.

After the polymer had been washed with water, the polymer was reprecipitated from hot NMP. 516 g of the polymer was added to 4000 ml of hot NMP to form an amber solution. The hot solution was filtered and water was then added to the solution to precipitate the solid polymer. The white solid was washed several times with hot water and treated with 10 g of zinc acetate in an autoclave as described in Example I. The product was Polymer 21, which had an I.V. of 0.41 dL/g and a Tg of 257° C. A control polyphenylene sulfide sulfone (PPSS) Polymer 22 made with only BCPS was prepared for comparison.

Polymers 21 and 22 were ground to a fine powder with a particle size of less than about 20 microns for preparing a carbon fiber reinforced prepreg structure for later composite production. A small prepreg line containing a carbon fiber creel, polymer slurry bath, drying ovens, heated shaping die, and pull rolls was used to produce a unidirectional, carbon fiber reinforced prepreg.

A slurry bath was prepared from 95 g of Polymer 21, 2500 g distilled water, and 2 mL of an ethoxylated nonylphenol (Triton X-100) surfactant. Two tows of continuous carbon fiber reinforcement (12K AS-4) were passed through the aqueous polymer slurry bath at a rate of about 130 centimeters per minute. The wet, polymer impregnated continuous carbon fiber band was pulled through a guide mechanism, a drying section at about 450° C., and a heated (365° C.), 12.7 mm wide shaping die. The product was a tape containing about 66 weight percent carbon fiber. A similar prepreg tape was prepared from control Polymer 22 using a dryer temperature of about 425° C. and a die temperature of about 368° C.

The prepreg tapes were cut into shorter segments and plied for compression molding in a press into 25.4 cm × 25.4 cm × 1.6 mm unidirectional laminates for testing. The molding temperatures were about 360° C. for Polymer 21 laminates and about 345° C. for Polymer 22 laminates. As shown in Table VI, the physical properties at 24° C. of laminates of the copolymer 21 and homopolymer 22 are similar.

TABLE VI

| | Composite Properties[a] | |
|---|---|---|
| Type | Polymer 21 Copolymer | Polymer 22 PPSS |
| Longitudinal | | |
| Tensile Modulus, MPa | 116,900 | 124,100 |
| Tensile Strength, MPa | 1800 | 1800 |
| Flexural Modulus, MPa | 119,700 | 126,900 |
| Flexural Strength, MPa | 1600 | 1800 |
| Transverse | | |
| Tensile Modulus, MPa | 8100 | 8300 |
| Tensile Strength, MPa | 30 | 30 |

[a] At 24° C.
[b] 50 mole percent BCPSB.

Figure 2:
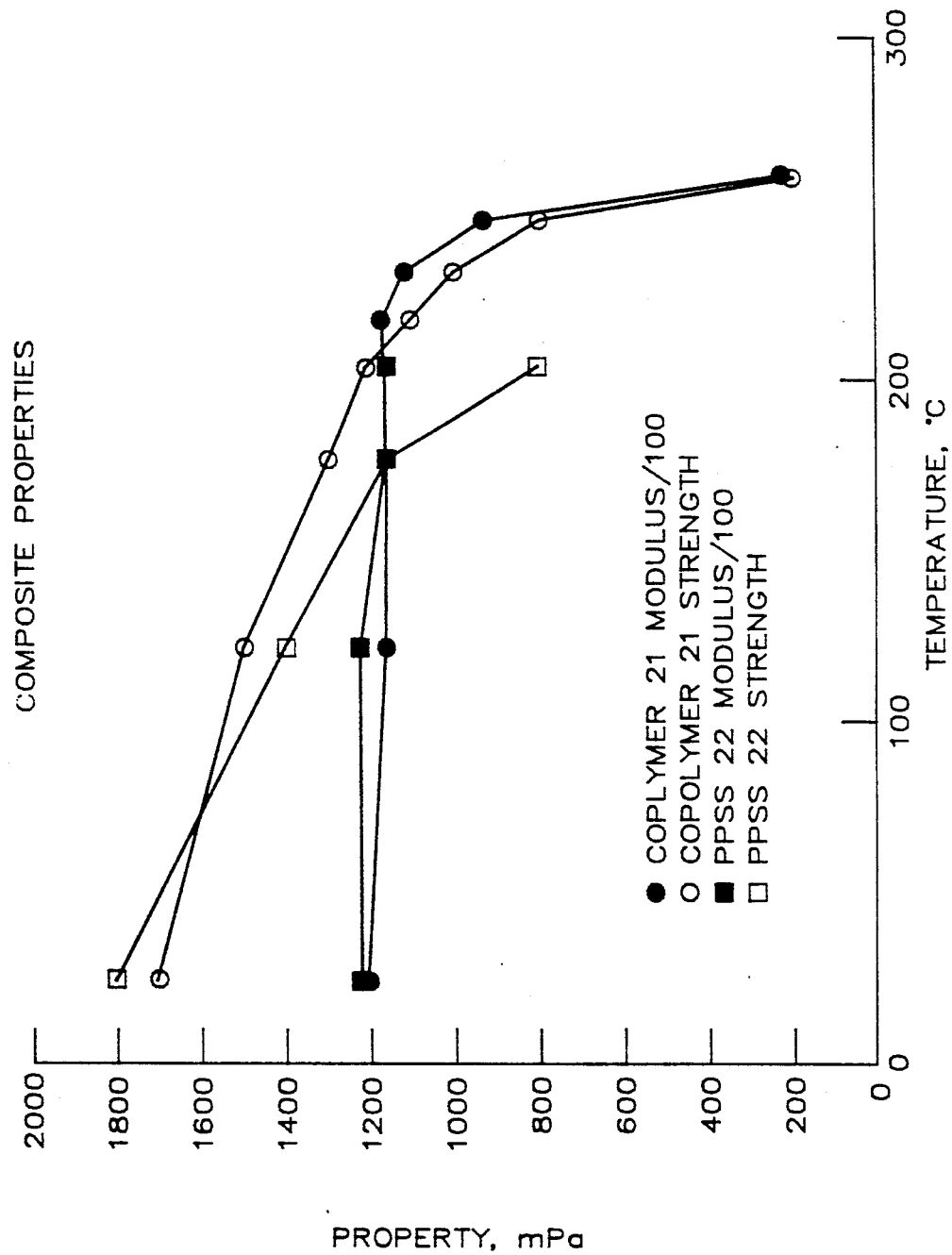
FIG. 2 is a plot demonstrating the composite laminate properties as a function of testing temperature for an inventive arylene sulfide sulfone copolymer compared to a poly(phenylene sulfide sulfone).

The advantage of the copolymers of the present invention is in the high temperature properties. A study of the physical properties of laminates made from Polymers 21 and 22 over a wide temperature range was made and the results are summarized in Table VII. The PPSS control laminate from Polymer 22 had a sharp drop in properties above about 204° C., while the laminate from copolymer 21 held its properties until around 250° C. FIG. 2 shows a plot of the laminate property as a function of testing temperature for Polymers 21 and 22. The figure clearly shows the significant difference in the high temperature retention of properties of laminates of the copolymer 21 compared with laminates of the homopolymer 22.

TABLE VII

| Composite Flexural Properties at Various Temperatures | | | | |
|---|---|---|---|---|
| | Polymer 21 | | Polymer 22 | |
| Temperature, °C. | Modulus, MPa | Strength, MPa | Modulus, MPa | Strength, MPa |
| 24 | 120,500 | 1700 | 122,300 | 1800 |
| 121 | 116,300 | 1500 | 122,300 | 1400 |
| 177 | 118,800 | 1300 | 119,200 | 1200 |
| 204 | 116,100 | 1200 | 116,100 | 800 |
| 218 | 117,000 | 1100 | a | a |
| 232 | 111,900 | 1000 | b | b |
| 246 | 93,000 | 800 | b | b |
| 260 | 22,800 | 200 | b | b |

[a] Could not be determined due to loss in strength.
[b] Not determined.

EXAMPLE VI

Another copolymer was prepared according to the method of this invention for composite formation and testing. A polymerization run was carried out using 75 mole percent BCPSB and 25 mole percent BCPS in a procedure similar to that described in Example I. As a base, 1.5 g-mol sodium hydroxide was used instead of sodium carbonate. A 3 mole percent excess of total chlorine-containing monomer (BCPSB plus BCPS) over the NaSH level was used. A 98 mole percent yield of the polymer was obtained. The polymer had an I.V. of 0.31 dL/g, a melt flow of 14 g/10 min, and a 0.21 weight percent ash.

After the polymerization, the polymer was treated with zinc acetate and acetic acid (as described in Example I for Polymer 1A) to produce Polymer 23, which had an I.V. of 0.31 dL/g, a melt flow of 16 g/10 min, and an ash level of 0.01 weight percent.

A prepreg was prepared from finely ground Polymer 23 in a procedure similar to that described in Example V. Laminate panels about 1.6 mm thick were compression molded using 20 plies at about 360° C. for testing. The laminate was cut into test specimens and tested for physical properties. The results are shown in Table VIII.

TABLE VIII

| | Composite Properties[a] |
|---|---|
| Type | Polymer 23 Copolymer[b] |
| Longitudinal | |
| Tensile Modulus, MPa | 110,300 |
| Tensile Strength, MPa | 1800 |
| Flexural Modulus, MPa | 104,400 |
| Flexural Strength, MPa | 1700 |
| Transverse | |
| Tensile Modulus, MPa | 6300 |
| Tensile Strength, MPa | 41 |
| Flexural Modulus, MPa | 7100 |
| Flexural Strength, MPa | 66 |

[a] At 24° C.
[b] 75 mole percent BCPSB.

Another panel of the laminate from polymer 23 was cut into 2.54 cm×5.08 cm×1.6 mm pieces for hot-wet testing. These small samples were immersed in water in a pressurized vessel at 121° C. and 0.34 MPa for 24 hours. The recovered samples were dried at 219° C. and 232° C. for 30 minutes. Samples heated to 232° C. were blistered and disfigured while the samples heated to 219° C. were unchanged in appearance from the original samples. A similar test with a laminate made from a homopolymer made from BCPS had a poor appearance after drying at 177° C. and a good appearance after drying at 149° C. Therefore, the laminates made from copolymers produced with both BCPSB and BCPS have significantly better hot-wet properties than laminates made with BCPS alone.

That which is claimed is:

1. A reinforced plastic comprising:
   (a) continuous long fiber reinforcement in
   (b) an arylene sulfide sulfone copolymer matrix wherein said arylene sulfide sulfone copolymer consists essentially of units within the polymer backbone represented by the formulas

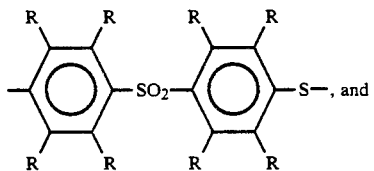
(III)

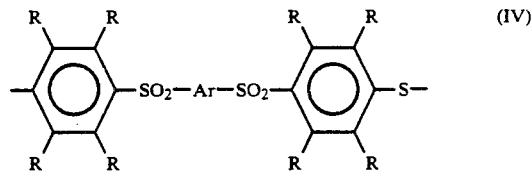
(IV)

wherein Ar is a divalent radical selected from the group consisting of

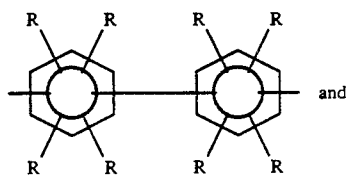
and

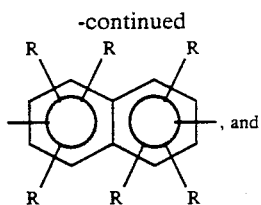

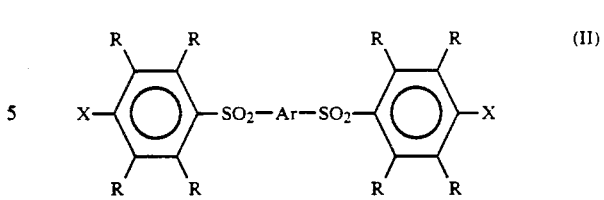

each R is selected from the group consisting of hydrogen and alkyl radicals having 1 to about 4 carbon atoms, the total number of carbon atoms in all of the R groups in the molecule being 0 to about 12, and wherein the number of said units of formula (IV) is about 5 to about 95 percent of the sum of the number of said units of formula (III) and the number of said units of formula (IV).

2. A reinforced plastic according to claim 1 wherein said continuous long fiber reinforcement is selected from the group consisting of randomly-oriented loose fibers, fiber mat, and unidirectionally oriented fibers.

3. A reinforced plastic according to claim 1 wherein said continuous long fibers are selected from the group consisting of aramid and fiber-forming inorganic materials.

4. A reinforced plastic according to claim 3 wherein said fiber-forming inorganic materials are selected from the group consisting of glass, carbon, metal, beryllia, magnesia, alumina, silica, zirconia, thoria, boron nitride, boron carbide, silicon carbide and alumino-silicate.

5. A reinforced plastic according to claim 1 wherein said arylene sulfide sulfone copolymer has a glass transition temperature in the range of 225° to 280° C. and an inherent viscosity of at least 0.3 dL/g.

6. A reinforced plastic according to claim 1 wherein the number of said units of formula (IV) is about 60 to about 95 percent of the sum of the number of said units for formula (III) and the number of said units of formula (IV).

7. A reinforced plastic according to claim 6 wherein the number of said units of formula (IV) is about 70 to about 90 percent of the sum of the number of said units of formula (III) and the number of said units of formula (IV).

8. A reinforced plastic according to claim 1 wherein said arylene sulfide sulfone copolymer comprises about 20 to about 50 weight percent of said reinforced plastic.

9. A reinforced plastic according to claim 1 wherein said arylene sulfide sulfone copolymer is prepared by a process comprising contacting:

(a) a dihaloaromatic sulfone having the formula (I),

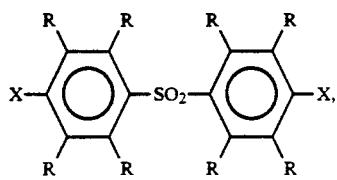

(b) a dihalaromatic sulfone having the formula (II)

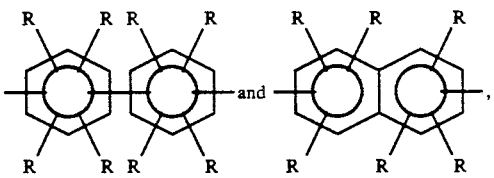

where Ar is a divalent radical selected from the group consisting of

R R R R R R
[hexagon with R substituents]—[hexagon with R substituents] and [fused bicyclic with R substituents],
R R R R R R (c) at least one organic amide,
(d) at least one sulfur-containing compound, and
(e) water, wherein each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups in the molecule being 0 to about 12, and wherein said dihaloaromatic sulfone of formula (II) is about 5 to about 95 mole percent of the sum of the number of moles of said dihaloaromatic sulfone of formula (I) and said dihaloaromatic sulfone of formula (II).

10. A reinforced plastic according to claim 9 wherein the molar ratio of the sum of said dihaloaromatic sulfone of formula (I) and said dihaloaromatic sulfone of formula (II) to said sulfur-containing compound is about 0.7:1 to about 1.3:1, the molar ratio of said organic amide to said sulfur-containing compound is about 2:1 to about 24:1, and the molar ratio of said organic amide to said water is about 0.4:1 to about 1.6:1.

11. A reinforced plastic according to claim 10 wherein said organic amide is selected from the group consisting of cyclic and acyclic organic amides having 1 to about 10 carbon atoms per molecule.

12. A reinforced plastic according to claim 11 wherein said sulfur-containing compound is selected from the group consisting of alkali metal sulfides, alkali metal bisulfides and hydrogen sulfide.

13. A reinforced plastic according to claim 12 further comprising an alkali metal carboxylate having the formula R′CO$_2$M wherein R′ is a hydrocarbyl radical containing 1 to about 20 carbon atoms, and M is an alkali metal.

14. A reinforced plastic according to claim 13 further comprising a base selected from the group consisting of alkali metal hydroxide, alkali metal carbonate, and mixtures of at least one alkali metal hydroxide with at least one alkali metal carbonate.

15. A reinforced plastic according to claim 14 wherein the molar ratio of said alkali metal carboxylate to said sulfur-containing compound is about 0.002:1 to about 2:1.

16. A reinforced plastic according to claim 15 wherein said dihaloaromatic sulfone of formula (I) is bis(4-chlorophenyl)sulfone and said dihaloaromatic sulfone of formula (II) is 4,4′-bis(p-chlorophenylsulfonyl)biphenyl.

17. A reinforced plastic according to claim 9 wherein said dihaloaromatic sulfone of formula (II) is about 60 to about 95 mole percent of the sum of the number of moles of said dihaloaromatic sulfone of formula (I) and said dihaloaromatic sulfone of formula (II).

18. A reinforced plastic according to claim 9 wherein said Ar is "R" groups on the biphenyl group "Ar".

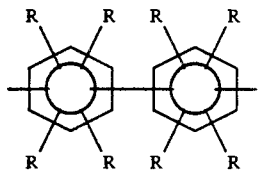

19. A reinforced plastic according to claim 1 wherein said Ar is

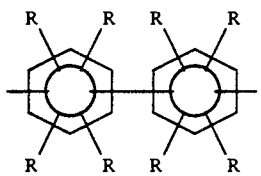

20. A reinforced plastic comprising:
(a) continuous long fiber reinforcement in
(b) an arylene sulfide sulfone copolymer matrix wherein said arylene sulfide sulfone copolymer consists essentially of units within the polymer backbone represented by the formulas

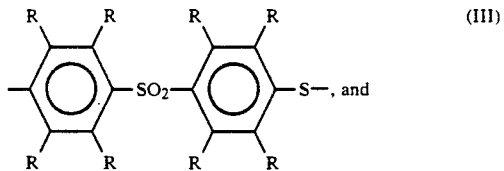

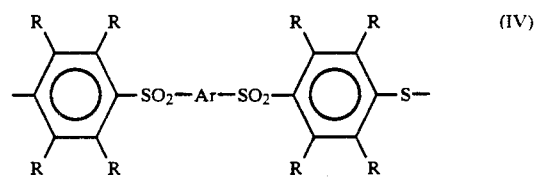

wherein Ar is

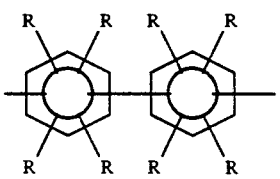

and each R is hydrogen, and wherein the number of said units of formula (IV) is about 5 to about 95 percent of the sum of the number of said units of formula (III) and the number of said units of formula (IV), wherein said arylene sulfide sulfone copolymer is prepared by a process comprising contacting bis(4-chlorophenyl)sulfone, 4,4'-bis(p-chlorophenyl sulfonyl)biphenyl, at least one organic amide, at least one sulfur-containing compound, and water, wherein said 4,4'-bis(p-chlorophenyl sulfonyl)biphenyl is about 5 to about 95 mole percent of the sum of the number of moles of said bis(4-chlorophenyl)sulfone and said 4,4'-bis(p-chlorophenyl sulfonyl)biphenyl.

* * * * *